(12) United States Patent
Hikmet et al.

(10) Patent No.: US 7,834,963 B2
(45) Date of Patent: Nov. 16, 2010

(54) OPTICAL INTEGRATOR

(75) Inventors: Rifat A. M. Hikmet, Eindhoven (NL);
Ties Van Bommel, Molenstraat (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1194 days.

(21) Appl. No.: 10/596,223

(22) PCT Filed: Dec. 8, 2004

(86) PCT No.: PCT/IB2004/052706

§ 371 (c)(1),
(2), (4) Date: Jun. 5, 2006

(87) PCT Pub. No.: WO2005/057254

PCT Pub. Date: Jun. 23, 2005

(65) Prior Publication Data

US 2009/0015771 A1    Jan. 15, 2009

(30) Foreign Application Priority Data

Dec. 10, 2003   (GB)   ................... 0328586.3

(51) Int. Cl.
*G02F 1/1335*   (2006.01)
(52) U.S. Cl. ................................ 349/112
(58) Field of Classification Search ........... None
See application file for complete search history.

(56) References Cited

U.S. PATENT DOCUMENTS

| | | | | | |
|---|---|---|---|---|---|
| 4,221,697 | A | * | 9/1980 | Osborn et al. | 524/853 |
| 5,995,183 | A | * | 11/1999 | Tsuyoshi | 349/112 |
| 6,002,464 | A | * | 12/1999 | Fujisawa et al. | 349/112 |
| 6,731,359 | B1 | * | 5/2004 | Fukaya | 349/112 |
| 2004/0081498 | A1 | * | 4/2004 | Tu | 400/118.2 |

* cited by examiner

*Primary Examiner*—David Nelms
*Assistant Examiner*—Lucy P Chien

(57) ABSTRACT

A method of manufacturing an optical integrator panel is provided. The method comprises the steps of: suspending a plurality of elongate particles in a liquid; applying an electric or magnetic field to the suspension to orientate the particles with parallel longitudinal axes; and solidifying the liquid to fix the orientation of the particles, thereby forming an optical integrator panel having a homogeneous distribution of elongate particles. An optical integrator panel is also provided. The optical integrator panel is adapted to reduce the angular dependence of contrast of a liquid crystal display. Specifically, the optical integrator panel is for placement in the path of reflected or transmitted light emitted by the liquid crystal display. The optical integrator panel comprises: a solid transparent panel; and a plurality of elongate particles homogeneously distributed in the panel, wherein the plurality of elongate particles are orientated with parallel longitudinal axes.

15 Claims, 11 Drawing Sheets

OPTICAL INTEGRATOR

This invention relates to an optical integrator. More particularly, but not exclusively, this invention relates to an optical integrator for use in reducing the viewing angle dependence of the image contrast of a liquid crystal display (LCD) device. This invention also relates to an LCD device comprising an optical integrator.

LCD devices are common in many items of electronic equipment such as visual display units (VDUs) for computers, and televisions. The devices are used to generate and convey information in the form of visual images to a user or audience. One of the requirements of such devices is that the generated image should be visible from a wide range of viewing angles. Another requirement is that the characteristics of the generated image should not vary with the viewing angle.

One of the most common forms of LCD device is the twisted nematic (TN) configuration. An exemplary TN cell is shown in FIG. 1, in section. In the TN cell 1, nematic liquid crystals 3 are aligned between a pair of glass substrates 5, 7. Each of the glass substrates 5, 7 is coated with a polarizing film 9, 11 on its outer surface and a transparent electrode 13, 15 on its inner surface. The glass substrates 5, 7 are orientated so that absorption axes of their respective polarisation films 9, 11 are at right angles. The nematic liquid crystals 3 have a helical axis in a direction normal to the plane of the glass substrates 5, 7 and their alignment structure is such that the twisted angle of the axis is 90°. The nematic liquid crystals 3 are orientated so that the layers of crystals in contact with the transparent electrodes 13, 15 are parallel to one of the absorption axis of the respective polarisation films 9,11.

When no voltage is applied to the transparent electrodes of the TN cell, linearly polarised incident light is rotated through 90° by the aligned liquid crystals so that the TN cell appears transparent. When a high voltage is applied, the nematic liquid crystals untwist so that linearly polarised incident light is not rotated. The linearly polarised light is thus unable to pass through the polarising film of both glass substrates so that the TN cell appears opaque. The transparent condition, the opaque condition and several intermediate positions therebetween are used to perform grey-scale display.

The nematic liquid crystals used in TN cells have a bar shaped molecular structure exhibiting positive refractive anisotropy, with a high refractive index in the direction of the molecular axis. This refractive index anisotropy causes polarised light passing obliquely through the TN cell to change direction along an axis that is not normal to the glass substrates. As a result, when an LCD device comprising the TN cell is observed from an angle that is different to the normal direction, the contrast of the display is lowered and the grey-scale display can be inverted. The latter effect is known as contrast inversion and is particularly undesirable. In contrast inversion, the grey-scale intensity of the observed image goes through a minimum before increasing again as the voltage applied to the electrodes is increased.

FIG. 2 shows the angles that define the observation characteristics of a TN cell. The z-axis is in a direction that is normal to the glass substrates of the TN cell. Angle $\theta$ is the angle to the z-axis at which the TN cell is observed and angle $\phi$ is an azimuth angle at which the TN cell is observed.

FIG. 3 shows iso-contrast profiles for a TN cell. It can be seen that the contrast distribution is heavily asymmetric. Specifically, the contrast of the display varies depending on the azimuth angle from which it is observed.

FIG. 4 shows intensity of an observed image as a function of electrode voltage for angle $\theta$ of 0°, 10°, 20°, 30°, 40° and 50°. In all of these cases, azimuth angle $\phi$ is 270°. It can be seen from FIG. 4 that, even at an angle $\theta$ of 20°, contrast inversion is present as the intensity goes through a minimum as a function of voltage before increasing at higher voltages.

In order to solve the problems associated with angular dependence of contrast and contrast inversion, optimisation and compensation techniques have been proposed. For example, one known solution involves the use of a phase retarder film exhibiting refractive index anisotrophy opposite to that of the nematic liquid crystals. Other proposed solutions involve the collimation of light along a direction giving good transmission characteristics, followed by scattering in order to widen the distribution of the light. However, none of these proposals have been entirely successful.

Accordingly, there is a need for an effective solution to the problems associated with angular dependence of contrast and contrast inversion in LCD devices. Any such solution needs to be simple to manufacture and assemble into an LCD device.

According to an aspect of the invention, there is provided a method of manufacturing an optical integrator panel, the method comprising the steps of: suspending a plurality of elongate particles in a liquid; applying an electric or magnetic field to the suspension to orientate the particles with parallel longitudinal axes; and solidifying the liquid to fix the orientation of the particles, thereby forming an optical integrator panel having a homogeneous distribution of elongate particles.

Specifically, an optical integrator panel manufactured in this way effectively reduces the angular dependence of contrast of a liquid crystal display and also eliminates contrast inversion when placed in the path of reflected or transmitted light emitted by the display. However, the above method also represents an efficient method of manufacturing an optical integrator panel for use in many other diverse applications that may or may not be related to display devices.

The optical integrator collects light coming from different directions, integrates or mixes the light, and projects the light further. As a result the contrast and transmission/voltage characteristics of an LCD device are averaged, leading to a symmetric distribution of contrast and the disappearance of contrast inversion. In the case of colour displays, such an optical integrator may also give better mixing of the colours.

The method preferably further comprises the step of bringing the suspension between two parallel substrates prior to the step of applying the electric or magnetic field. In this way the shape and thickness of the optical integrator panel may be accurately controlled.

The substrates are preferably coated with electrically conductive electrodes. At least one of the substrates and its respective electrode are preferably at least partially transparent to UV light. For example, the substrates may be made of glass and coated with ITO (indium tin oxide).

The ratio between thickness and length of the elongate particles is preferably at least 1:10, and more preferably at least 1:100. This ensures that the optical integrator does not excessively attenuate light. In order to minimise attenuation it is also preferable to choose particles of a material having surfaces that are highly reflective in the visible range. Aluminium and silver are examples of such highly reflecting materials. In order to minimise losses, the particles may also be of multi layer dielectric materials, also known as Bragg reflectors, which reflect light in the visible range with almost no absorption losses.

The particles preferably have a thickness in the range of 5 nm to 1 μm, more preferably 5 nm to 50 nm, and a length in the range 1 μm to 50 μm, more preferably 5 μm to 50 μm.

Preferably, the liquid becomes a flexible transparent solid after solidification.

The liquid is preferably a polymerisable liquid, and the step of solidifying the liquid comprises polymerising the liquid. In this case, the step of polymerising the liquid preferably comprises exposing the liquid to ultraviolet light to initiate a polymerisation reaction. Polymerisation may alternatively be thermally initiated, in which case a thermal initiator is used. The polymerisable liquid preferably comprises a (metha) acrylate, an epoxy, a vinylether monomer or a thiolene system. For example, it may comprise polyethyleneglycol (400) diacrylate.

The use of multifunctional monomers leads to the formation of cross-linked polymer networks. However the monomers may also be monofunctional. In this case, a linear polymer is obtained.

The liquid is alternatively a heated organic material having a solidification temperature (glass transition temperature or melting point) above 40° C., preferably above 60° C., and the step of solidifying the liquid comprises cooling the liquid to ambient temperature.

The liquid preferably has sufficient viscosity to maintain an evenly distributed suspension of elongate particles without preventing the elongate particles from becoming aligned with the electric or magnetic field.

Preferably, the suspension has a concentration of elongate particles by weight of less than 1%. More specifically, the suspension preferably has a concentration of elongate particles by weight in the range of 0.02% to 0.03%. This concentration has been found to provide an optical integrator panel having good performance.

The longitudinal axes of the elongate particles are preferably orientated to be perpendicular to the substrates. The particles are orientated along their longitudinal axes but are randomly orientated about these axes.

According to another aspect of the invention, there is provided an optical integrator panel having a homogeneous distribution of elongate particles, the optical integrator panel being manufactured in accordance with the first mentioned aspect of the invention.

The optical integrator panel preferably has a concentration of elongate particles by weight of less than 1%. More preferably, the optical integrator panel has a concentration of elongate particles by weight in the range of 0.02% to 0.03%.

The longitudinal axes of the elongate particles are preferably orientated to be perpendicular to the substrates used in manufacture. The particles are orientated along their longitudinal axes but are randomly orientated about these axes.

According to another aspect of the present invention, there is provided an optical integrator panel adapted to reduce the angular dependence of contrast of a liquid crystal display device, the optical integrator panel being for placement in the path of reflected or transmitted light emitted by the liquid crystal display device.

Although this optical integrator may take the form of any known optical integrator, for example multiple fibre optic wave guides, the optical integrator panel preferably comprises: a solid transparent panel; and a plurality of elongate particles homogeneously distributed in the panel, wherein the plurality of elongate particles are orientated with parallel longitudinal axes.

The ratio between thickness and length of the elongate particles is preferably at least 1:10, and more preferably at least 1:100. The elongate particles preferably have reflective surfaces and may, for example, be aluminium particles.

The thickness of the elongate particles may be in the range 5 nm to 1 μm, more preferably in the range 5 nm to 50 nm, and the length of the elongate particles may be in the range 1 μm to 50 μm, more preferably in the range 5 μm to 50 μm. The concentration of elongate particles by weight may be less than 0.1%, and preferably in the range of 0.02% to 0.03%.

The longitudinal axes of the elongate particles are preferably orientated to be perpendicular to the surfaces of the optical integrator panel. The particles are orientated along their longitudinal axes but are randomly orientated about these axes.

According to another aspect of the present invention, there is provided an optical integrator panel comprising: one of a transparent cured multifunctional metha(acrylate) panel, a transparent cured epoxy panel, a transparent cured vinylether monomer panel and a transparent cured thiolene system panel; and a plurality of elongate particles homogeneously distributed in the panel, wherein the plurality of elongate particles are orientated with parallel longitudinal axes.

The invention also provides a liquid crystal display device comprising the optical integrator panel described above. In the liquid crystal display device, the optical integrator panel may be positioned adjacent one of two substrates between which liquid crystals are held.

For a better understanding of the above features and advantages of the invention, embodiments will now be described, purely by way of example, with reference to the accompanying drawings in which.

Figure 5:
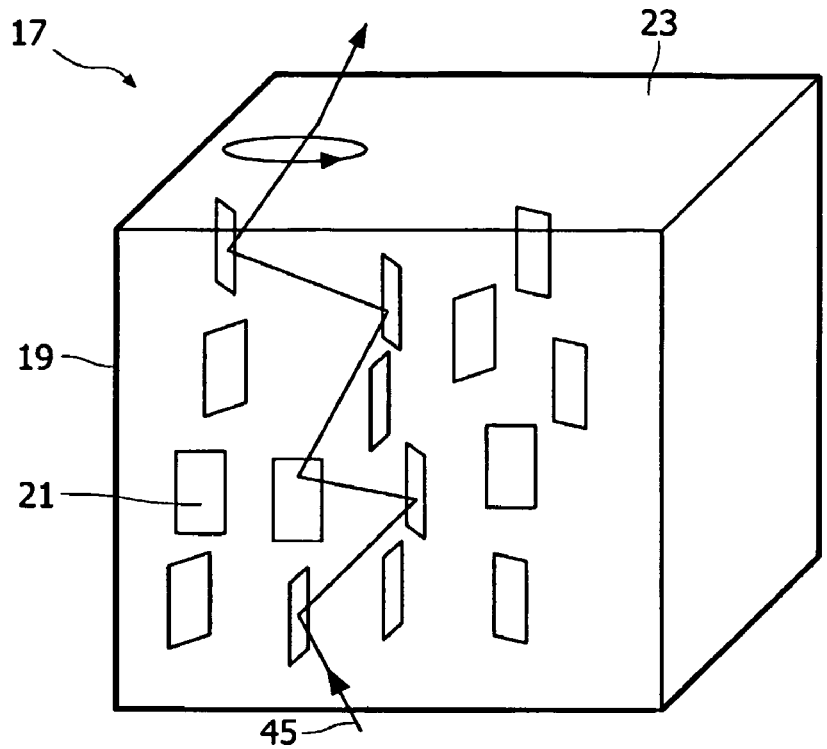
Figure 6:
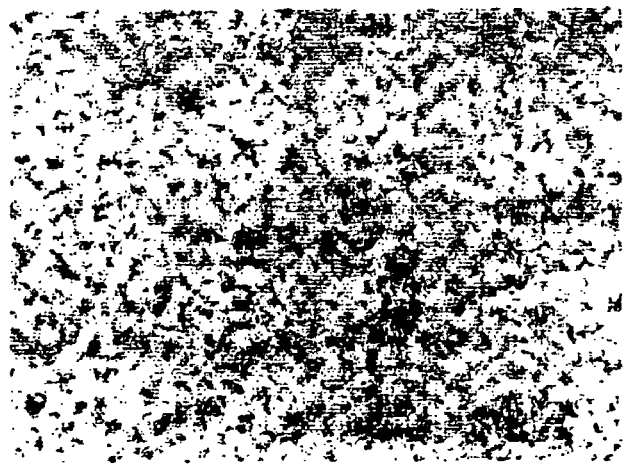
Figure 7A:
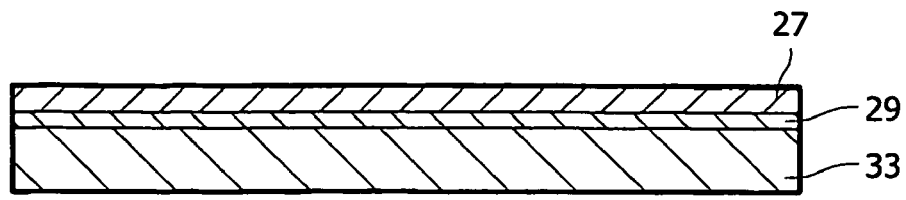
Figure 7B:
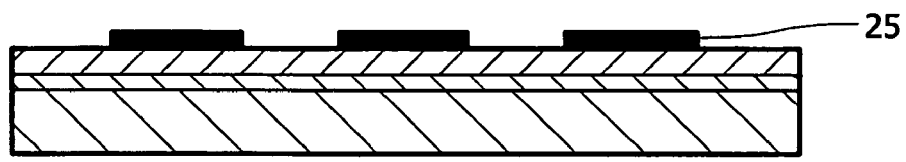
Figure 7C:
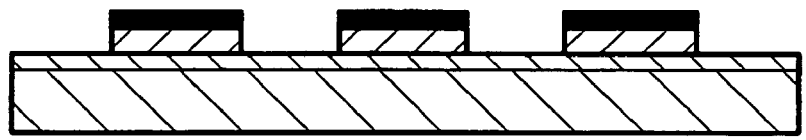
Figure 7D:
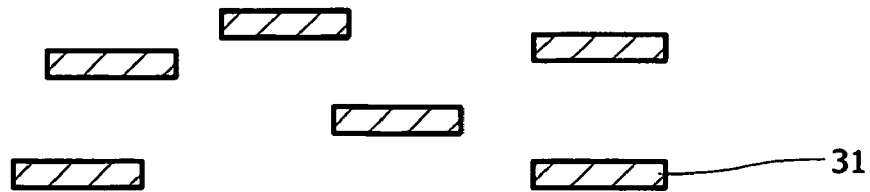
Figure 8A:
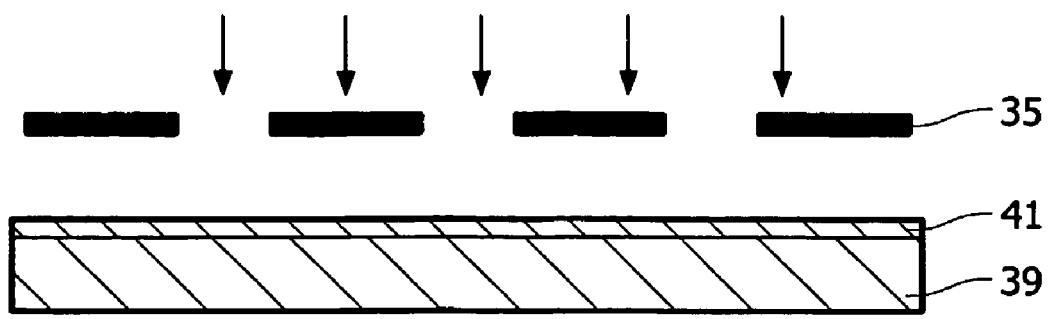
Figure 8B:
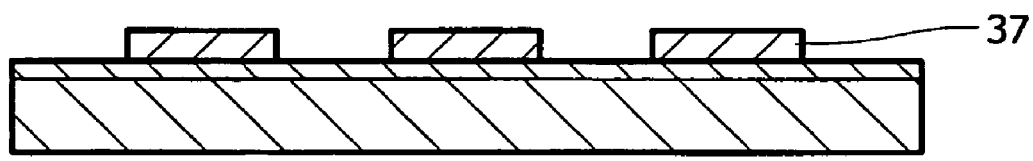
Figure 8C:
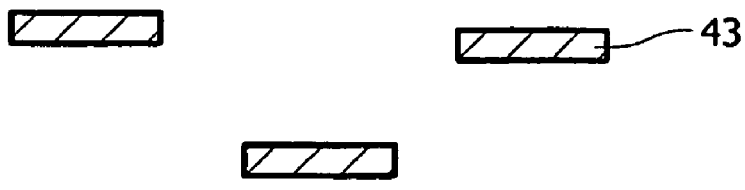
Figure 9A:
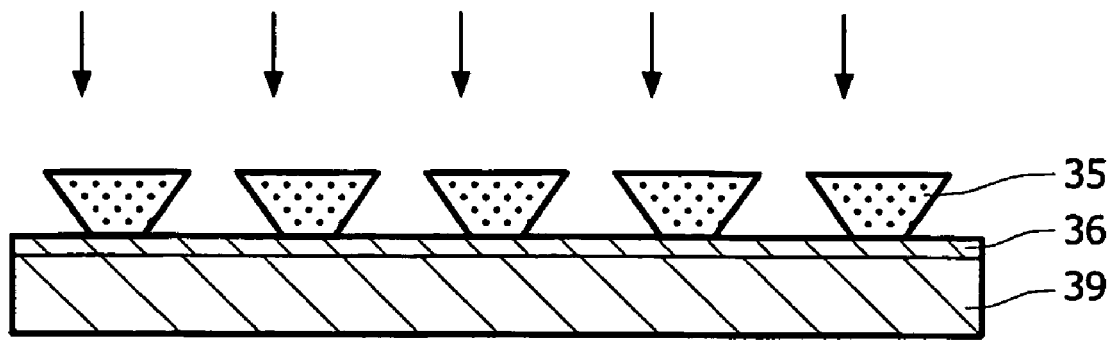
Figure 9B:
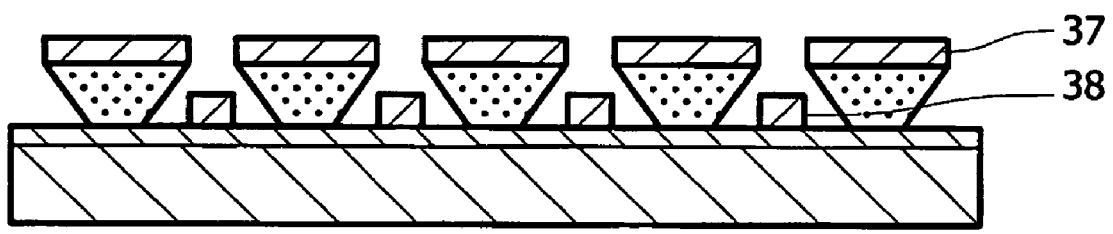
Figure 9C:
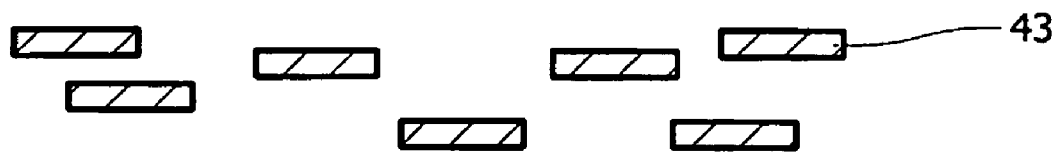
Figure 10:
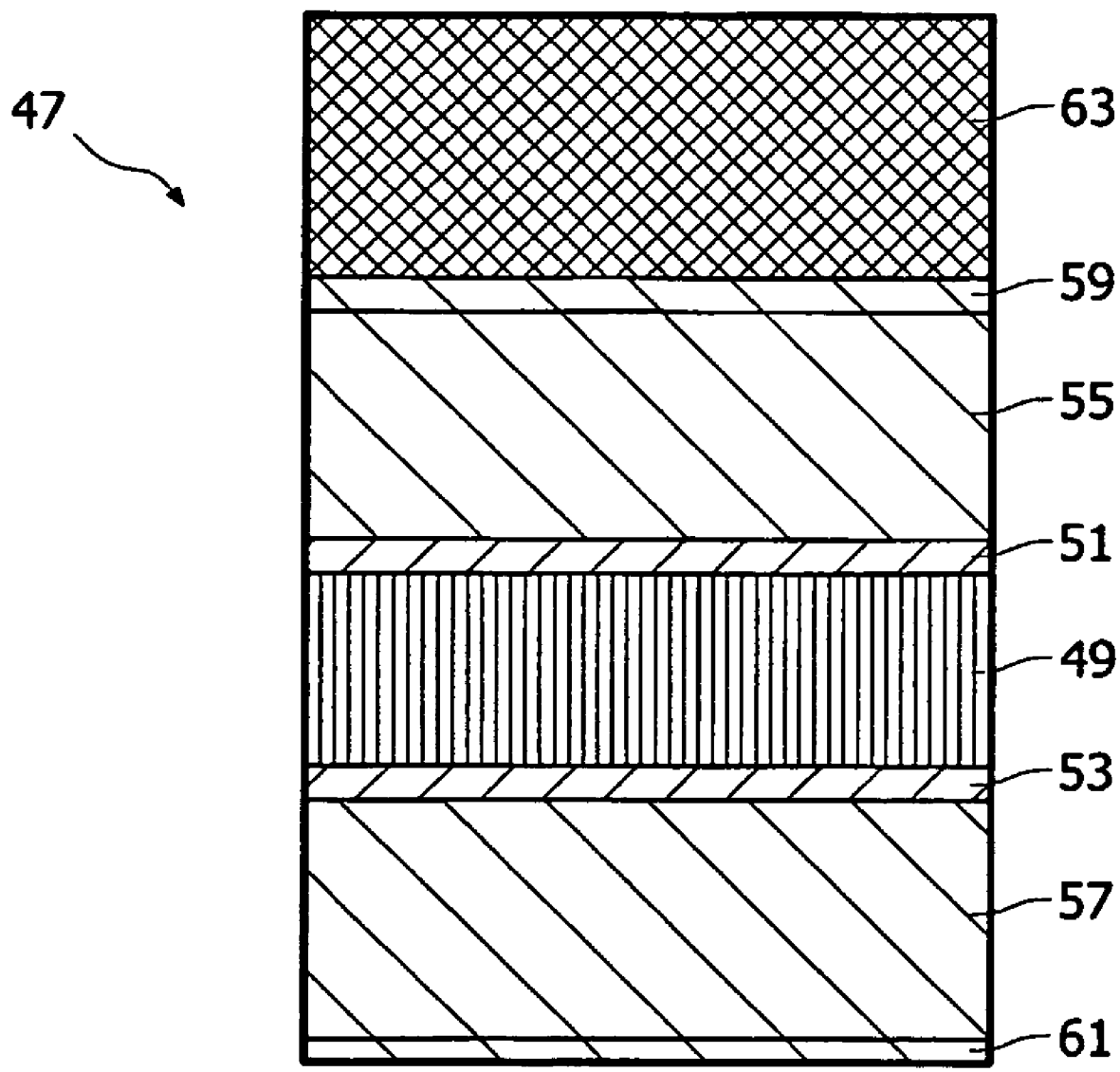
Figure 11:
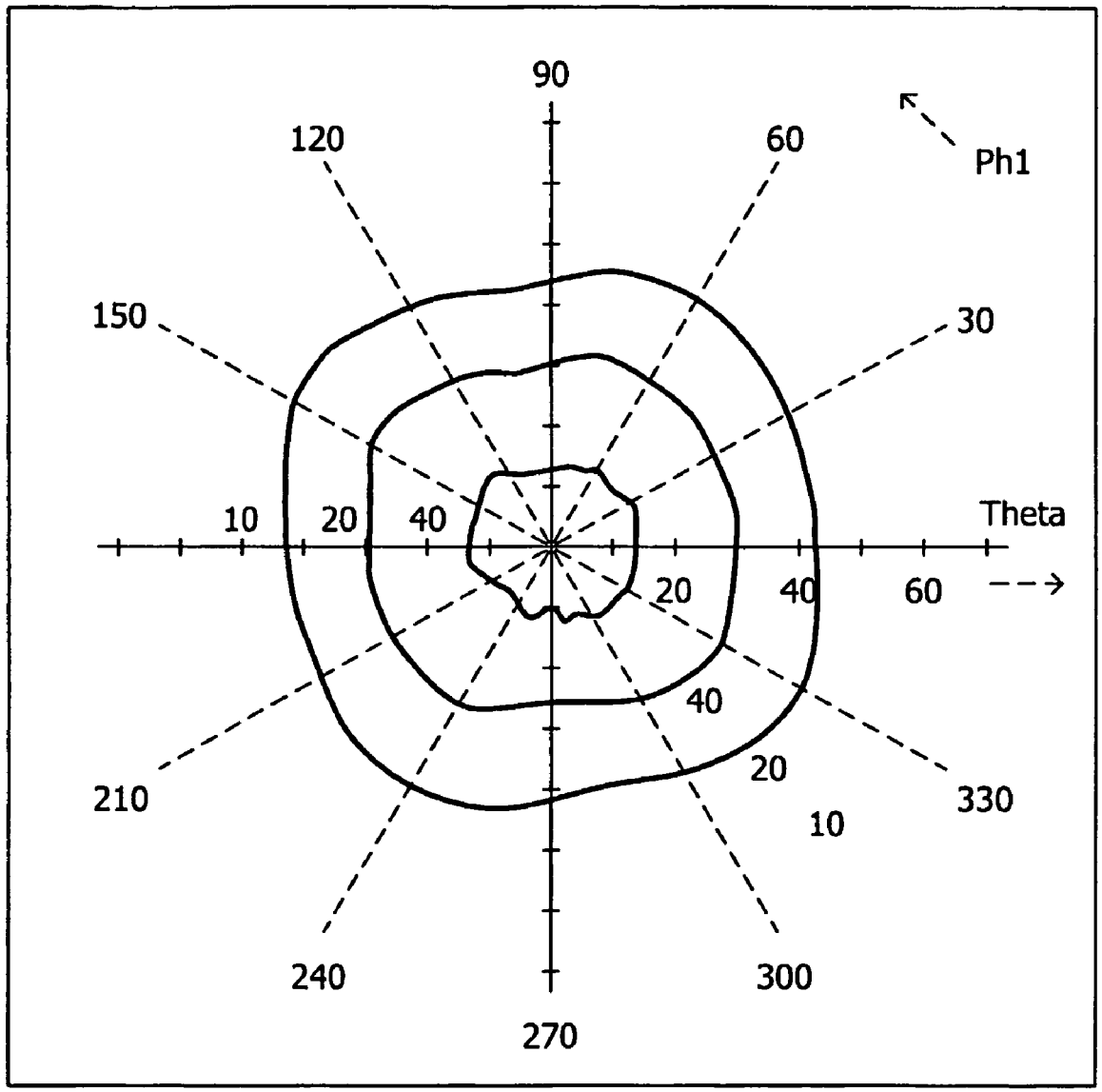
Figure 12:
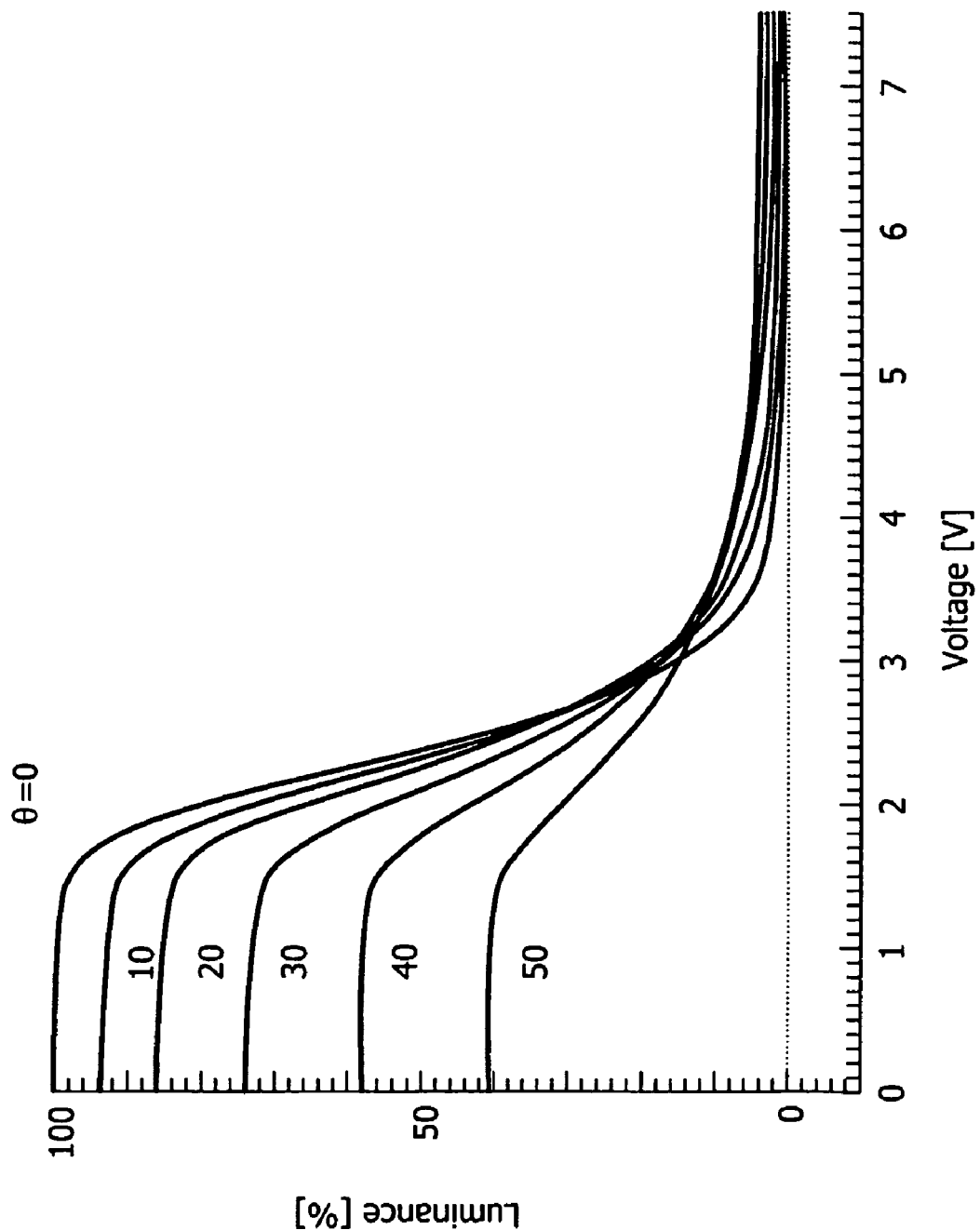
Figure 13:
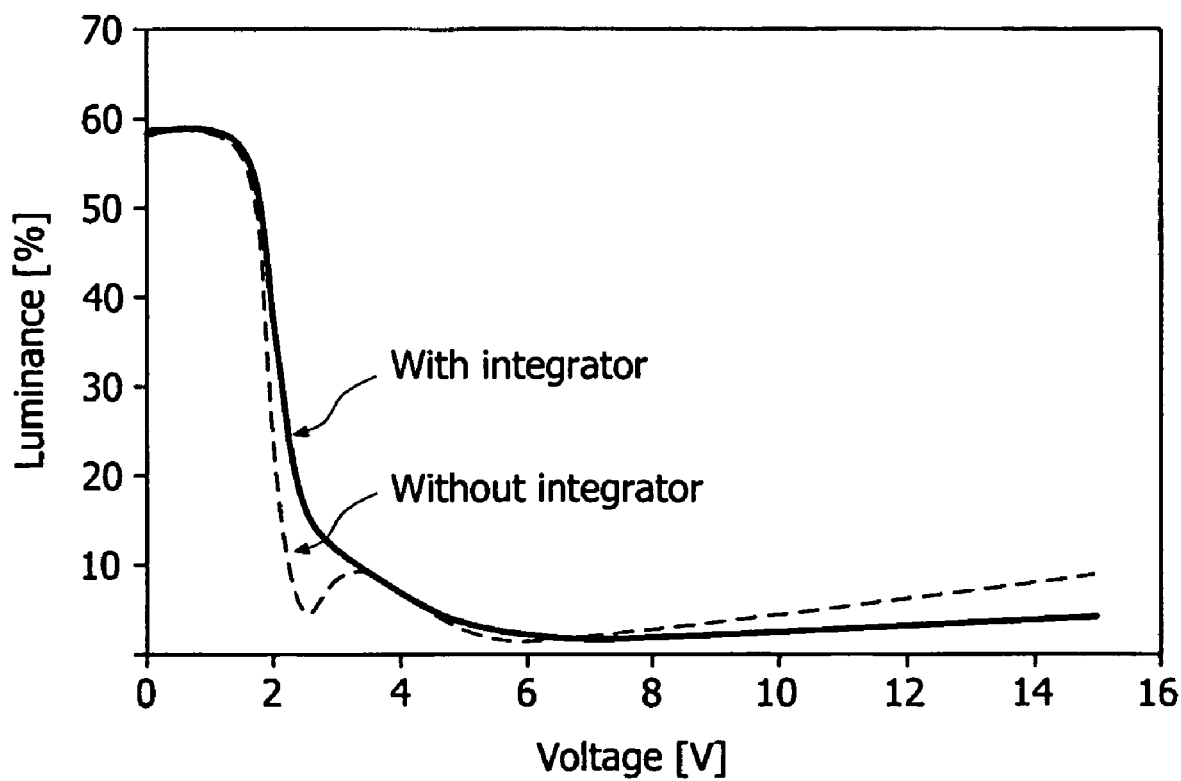

FIG. 5 schematically shows an optical integrator panel according to the present invention;

FIG. 6 shows a microscopic image of the optical integrator panel according to the present invention;

FIG. 7 schematically shows a first method of producing elongate particles for use in embodiments of the present invention;

FIG. 8 schematically shows a second method of producing elongate particles for use in embodiments of the present invention;

FIG. 9 schematically shows a third method of producing elongate particles for use in embodiments of the present invention;

FIG. 10 shows the structure of a TN cell of an LCD device according to the present invention, in section;

FIG. 11 shows the iso-contrast profiles for a TN cell of an LCD device having an optical integrator panel according to the present invention;

FIG. 12 shows the intensity of an observed image as a function of electrode voltage for the TN cell of the LCD device having the same optical integrator panel according to the present invention; and FIG. 13 shows the intensity of an observed image as a function of electrode voltage for a TN cell of an LCD device having a different optical integrator panel according to the present invention.

FIG. 5 schematically shows an optical integrator panel 17 according to the present invention. The optical integrator panel 17 essentially comprises a transparent polymer sheet 19 in which elongate particles 21 are suspended. The elongate particles 21 are uniformly distributed throughout the polymer and their longitudinal axes are aligned perpendicular to the surface 23 of the sheet. The elongate particles 21 are however free to rotate about their longitudinal axes. It can be seen from FIG. 5 that the particles 21 are rotated to differing angles, and are randomly arranged in this respect.

FIG. 6 shows a microscopic image of the optical integrator panel 17 according to the present invention. It can be seen from FIG. 6 that the elongate particles (dark regions) are uniformly distributed throughout the polymer (light regions).

A method of manufacturing the optical integrator panel 17 according to the invention will now be described in detail. Throughout this description, the term "electric field" is used to refer to a field that is used to orientate elongate particles within a liquid suspension. Electrodes of various forms are used to induce the electric field. However, the skilled reader will be aware that similar effects may be achieved using magnetic fields produced by permanent magnets. Accordingly, all such references to electric fields should be taken to include magnetic fields, when suitable for the particular types of particles.

Elongate, or flake-like, particles are first prepared. For some applications, particles having large variations in shape and size can be tolerated. Particles without good shape control and having a large distribution of sizes may be produced in several ways. One method is based on the evaporation of a thin layer on top of a substrate having a release coating, followed by its release and "milling" to small particle sizes. Other methods include the use of naturally occurring minerals such as mica, which can also be milled. Silicon and aluminium particles may also be produced in solution. However, as noted above, these materials have random shapes and dimensions.

For other applications, particles having a specific size, shape and/or surface property can result in an optical integrator panel having a higher performance. Accordingly, methods of preparing such particles are described.

FIG. 7 schematically shows a first method of producing elongate particles for use in embodiments of the present invention. This method may be performed using a variety of techniques such as offset printing, micro contact printing and inkjet printing. In all of these techniques, except for inkjet printing, a patterned surface or a surface to which ink has been transferred in a patterned way (a stamp) is used to transfer ink 25 to another surface comprising a layer to be patterned 27. The ink may be used as a positive or negative etch resist, depending on the type in ink. If it is used as a negative etch resist, material of the layer to be patterned 27 can be removed selectively by etching from those areas that are not covered or modified by the ink 25. If the ink is used as a positive etch resist, a second layer of ink providing a higher etch resistance is applied only to the so far unmodified areas of the surface (e.g. by deposition via self-assembly from solution). In this case, in the subsequent etching step, material is removed from those areas that had been modified with the first ink (the one with the lower etch resistance). Other inking-etching schemes are also possible, including the local (patterned) chemical modification of the ink already deposited on the surface.

It is important that the layer to be patterned 27 has a release layer 29 underneath it (between the layer to be patterned 27 and a substrate 33). The release layer 29 can then be dissolved in a suitable solvent leaving the free patterned structures 31 (particles, or flakes) dispersed in the solvent as shown in FIG. 7. The ink 25 may or may not be removed by dissolution in this solvent. If desired, the ink 25 may also be removed in another subsequent processing step.

It is also possible to use inkjet printing to produce the desired patterns. In that case the ink 25 can be brought on top of the layer to be patterned 27 in the form of micro droplets. Further processing will be analogous to the above description. However, due to its sequential nature, the inkjet printing technique is generally slower.

Optical lithography may also be used to pattern a layer of photoresist material covering the layer to be patterned 27 using a photomask. After development of the resist layer, the layer to be patterned 27 may be etched and particles 31, or flakes, are produced in the same way as described above.

FIG. 8 schematically shows a second method of producing elongate particles for use in embodiments of the present invention. A mask 35 is used to deposit a layer of particles 37 onto a substrate 39 provided with a release layer 41. The release layer 41 is then dissolved, thus producing free of particles, or flakes 43.

The mask 35 may also be manufactured on top of the substrate 39 as shown in FIG. 9. In this case, the particles 37 deposited on top of the mask 35 can be removed using a suitable solvent, thus providing free particles 43, while the material 38 deposited on an adhesion layer 36 is not removed. It is also possible to use an inverse technique where the deposited material adheres to the mask surfaces 35 and the material 38 deposited between the mask surfaces 35 is released.

The elongate particles, or flakes, may comprise a single layer or several layers of material. The material may be metallic, organic or inorganic. For example, the flakes may comprise a layered dielectric material reflecting a certain band of light. They may alternatively consist of two different layers having different physical (e.g. optical) or chemical surface properties. For example, a rigid substrate layer may be combined with an optically reflective layer. Such a technique may be used to increase the rigidity of reflective particles. It is also possible to combine layers that react with different molecules in different ways. For example, one of the surfaces may be chosen so that it specifically reacts with a polar molecule while the other surface may have a high reactivity with an apolar substance. In this way, particles with specific polar and apolar surfaces can be produced. The orientation of such particles may be easily controlled.

The particles, or flakes, may also be surface modified. For example, modification of the two surfaces of a particle having polar and apolar groups, respectively, may be used to orient surfaces with the same polarity in the same direction.

Reactive groups may also be attached to the surfaces of particles. Particles having reactive groups may be co-polymerised in a solution containing other reactive molecules and made to become part of a polymeric chain. In this way, stable suspensions of particles can be later produced.

Referring again to FIG. 5, in order to manufacture the optical integrator panel 17, elongate particles 21 prepared by one of the above methods are suspended in a polymerisable liquid. In this example, the particles 21 are aluminium flakes having a mean thickness of 10 nm and length of 9 to 11 μm, and the polymerisable liquid is polyethyleneglycol (400) diacrylate. The aluminium flakes 21 are added to the polyethyleneglycol (400) diacrylate at a concentration by weight of 0.025%. The flakes may be uniformly distributed within the liquid by physically mixing the suspension.

Once the aluminium flakes are evenly distributed, the suspension is brought between two ITO coated transparent glass substrates. The glass substrates are held apart at a fixed distance and are parallel. Next, an electric field is induced across the suspension by applying a voltage to electrodes. The electric field is induced so that field lines run perpendicular to the plane of the glass substrates. Transparent ITO electrodes capable of producing such field lines will be known to those skilled in the art.

The electric field causes the longitudinal axis of the suspended particles 21 to gradually become oriented along the field lines. Although the longitudinal axes of the suspended particles become orientated with the field lines, the suspended particles 21 are free to rotate about these axes and, in this respect they are randomly orientated, as shown in FIG. 5.

Once the all of the suspended particles 21 have become orientated by the electric field, polymerisation is initiated in order to "freeze in" the orientation of the particles. Polymerisation is initiated by exposing the suspension to ultraviolet (UV) light, for example, for one minute at approximately 1 mW/cm$^2$.

Once polymerisation is complete, the glass substrates are removed and a flexible transparent film having suspended orientated particles remains. This film is the optical integrator panel 17 of the present invention.

The specific orientation of the particles 21 (commonly orientated along their longitudinal axes and randomly orientated about their longitudinal axes) provides a medium in which light may be effectively mixed. This is shown in FIG. 5 by the beam of light 45 being randomly reflected by the reflective surfaces of the particles 21.

FIG. 10 shows the structure of a TN cell 47 of a first LCD device according to the present invention, in section. The TN cell comprises nematic liquid crystals 49, transparent electrodes 51, 53, glass substrates 55, 57 and polarising films 59, 61. The TN cell also comprises an optical integrator panel 63. The optical integrator panel 63 collects light that has passed through the polarising film 59 from the nematic liquid crystals 49, integrates or mixes the light, and projects the light further. As a result, the contrast and transmission/voltage characteristics of the TN cell are averaged, leading to a symmetric distribution of contrast and the disappearance of contrast inversion. In the case of colour displays, such an optical integrator panel also gives better mixing of the colours.

In order to investigate the effects of using an optical integrator panel with an LCD device, an optical integrator panel according to the invention was placed on top of the TN cell of an LCD device. This optical integrator comprised a plate containing fibre optic light guides oriented perpendicular to its surfaces. The display characteristics of the TN cell were then analysed.

Figure 1:
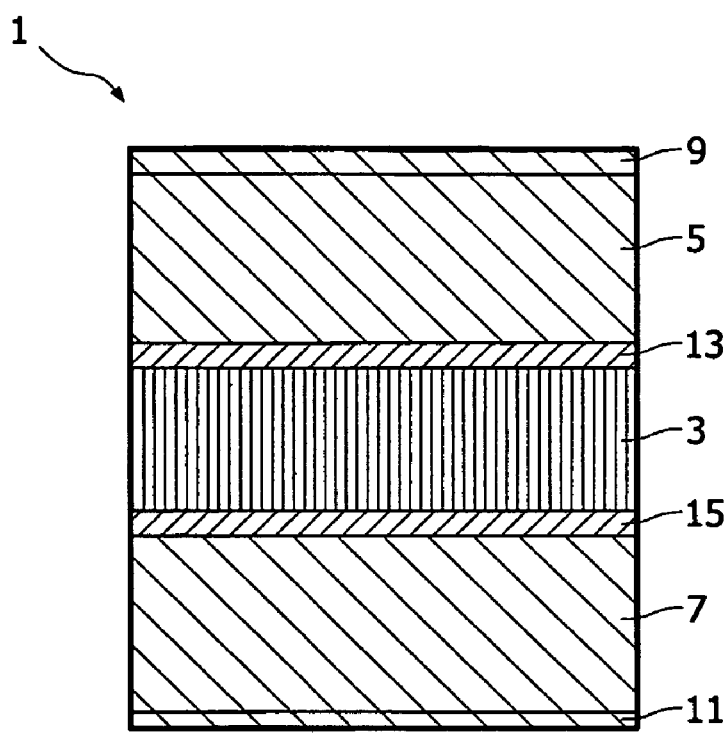
FIG. 1 shows the structure of a TN cell of a known LCD device, in section.
Figure 2:
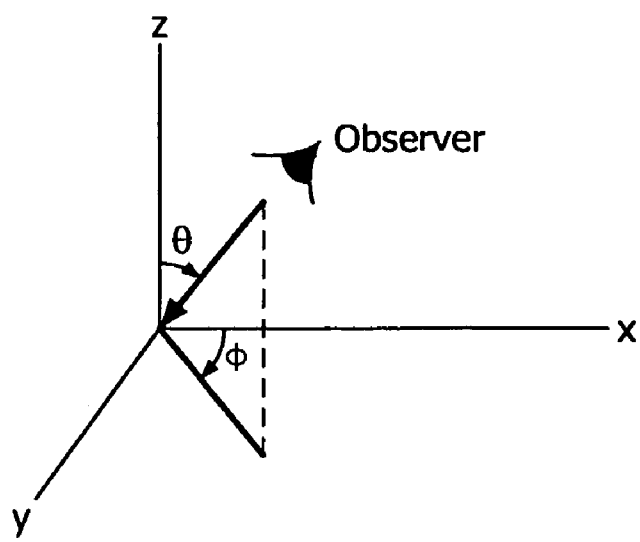
FIG. 2 shows the angles that define the observation characteristics of a TN cell of an LCD device.
Figure 3:
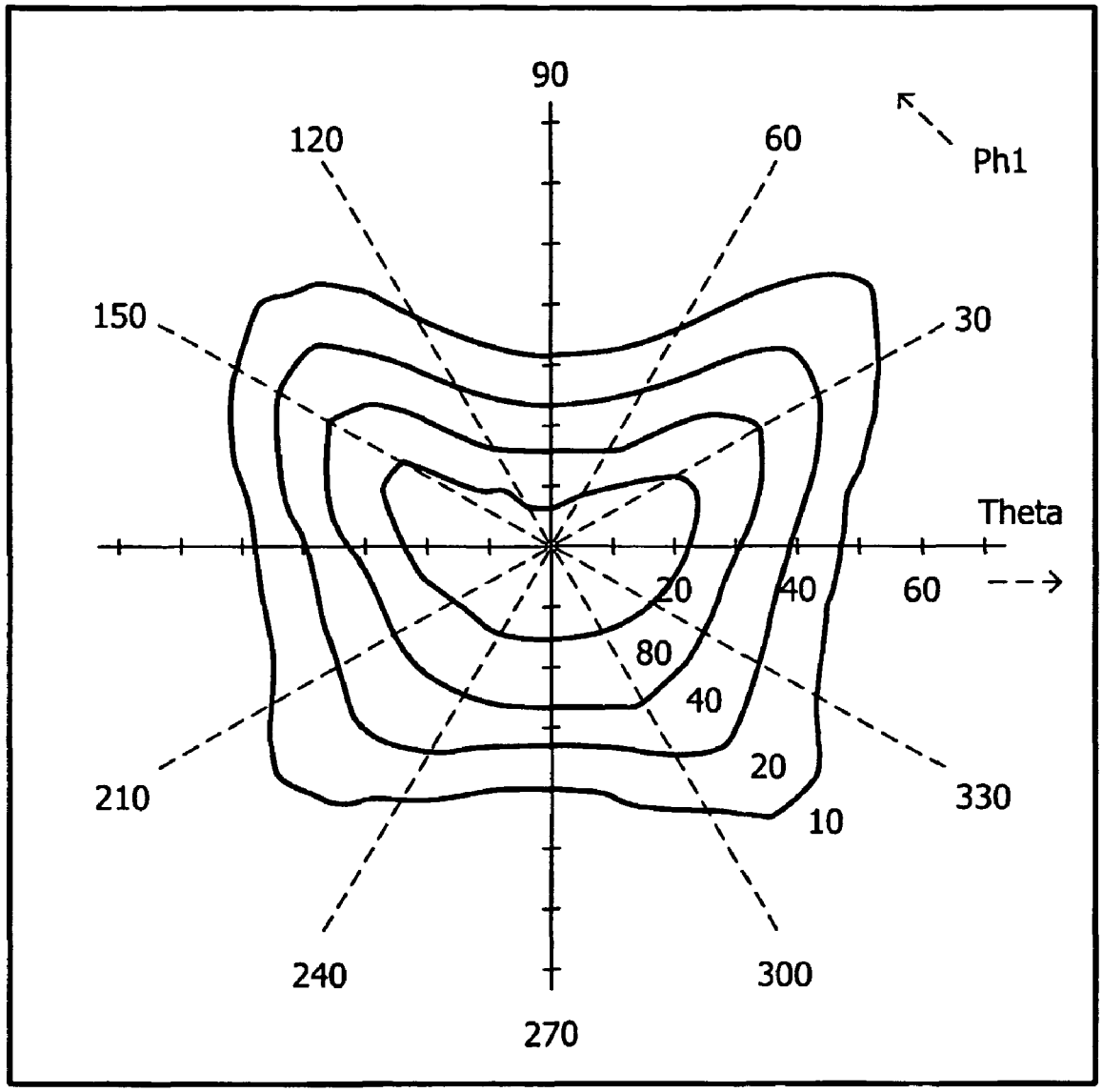
FIG. 3 shows the iso-contrast profiles for the TN cell of the known LCD device.
Figure 4:
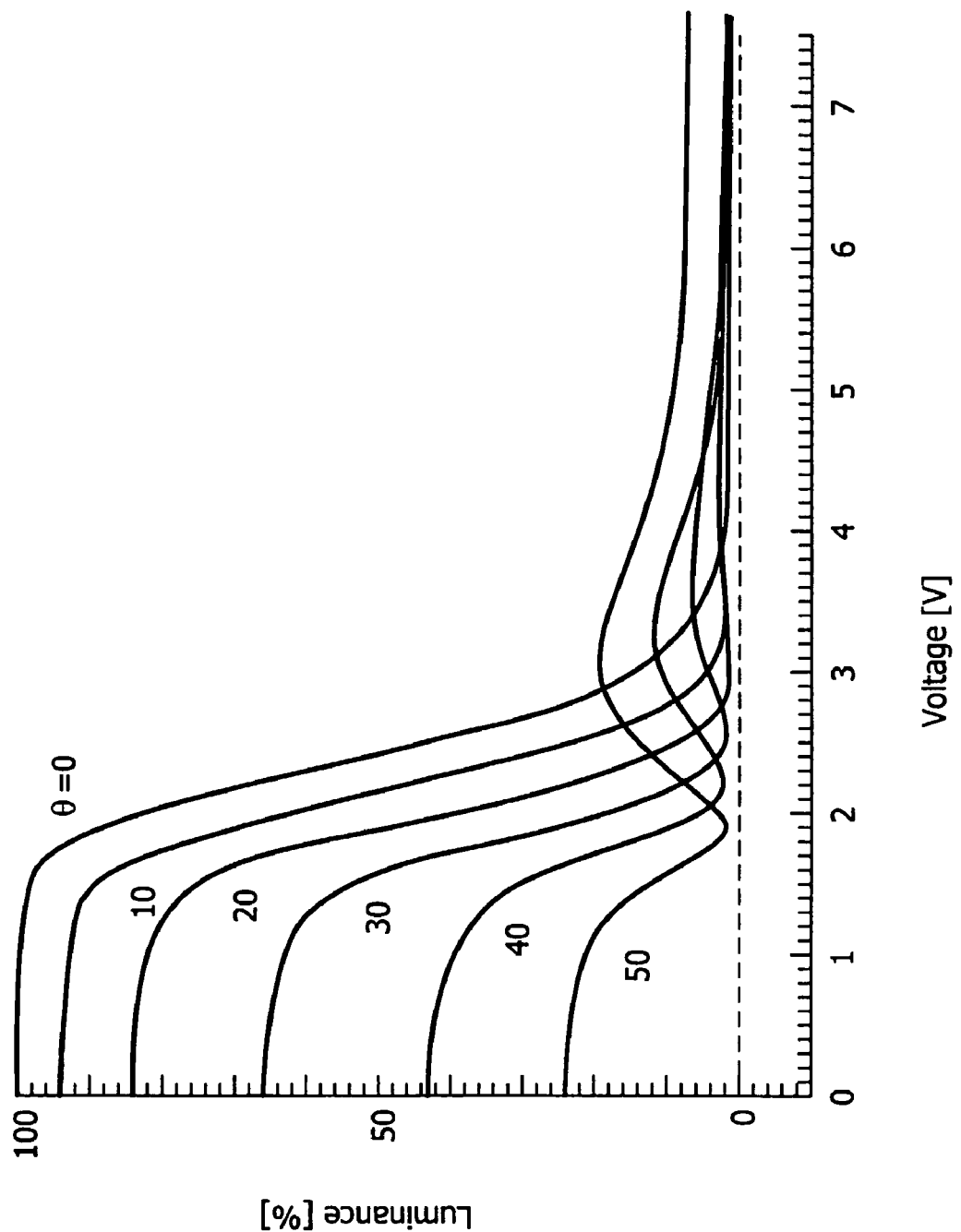
FIG. 4 shows the intensity of an observed image as a function of electrode voltage for the TN cell of the known LCD device.

FIG. 11 shows the iso-contrast profiles for the TN cell and FIG. 12 shows the intensity of an observed image as a function of electrode voltage for the TN cell. It can be seen from these Figures that the iso-contrast curves are far more symmetric than those of the known TN cell shown in FIG. 3. Furthermore, it can be seen from FIG. 12 that contrast inversion is eliminated.

A different optical integrator panel according to the invention was then placed on top of the TN cell of an LCD device. This optical integrator panel was the panel described above with reference to FIGS. 5 and 6 comprising elongate aluminium particles distributed in a flexible transparent film. The display characteristics of the TN cell were then analysed.

FIG. 13 shows the intensity of an observed image as a function of electrode voltage for the TN cell with and without the optical integrator panel described with reference to FIGS. 5 and 6. Again, it can be seen that contrast inversion was avoided by using this optical integrator panel.

It is to be understood that this detailed description discloses specific embodiments of a broader invention and is not intended to be limiting. There are many other embodiments within the scope of the invention as claimed hereafter, and these will be apparent to those skilled in the art.

For example, an optical integrator for use in reducing the viewing angle dependence of the image contrast of an LCD device has been described. However, the optical integrator may alternatively be for use in other applications which will be known to those skilled in the art.

The invention claimed is:

1. A method of manufacturing an optical integrator panel, the method comprising:
    suspending a plurality of elongate particles in a liquid;
    applying a electric or magnetic field to the suspension to orientate the particles with parallel longitudinal axes and random rotations about the respective parallel longitudinal axes; and
    solidifying the liquid to fix the orientation of the particles, thereby forming an optical integrator panel having a homogeneous distribution of elongate particles.

2. The method of claim 1, further comprising:
    bringing the suspension between two parallel substrates prior to applying the electric or magnetic field.

3. The method of claim 2, wherein the substrates are coated with electrically conductive electrodes, and wherein at least one of the substrates and its respective electrode are at least partially transparent to ultraviolet light.

4. The method of claim 1, wherein ratio between thickness and length of the elongate particles is at least 1:10.

5. The method of claim 1, wherein the elongate particles have reflective surfaces.

6. The method of claim 5, wherein the elongate particles comprise multiple layer dielectric materials.

7. The method of claim 1, wherein the thickness of the elongate particles is in the range 5 nm to 1 μm and the length of the elongate particles is in the range 1 μm to 50 μm.

8. The method of claim 1, wherein the liquid becomes a flexible transparent solid after solidification.

9. The method of claim 1, wherein the liquid comprises a polymerisable liquid, and solidifying the liquid comprises polymerising the liquid.

10. The method of claim 1, wherein the liquid comprises an organic material having a solidifying temperature above 40° C., and wherein solidifying the liquid comprises cooling the liquid.

11. The method of claim 9, wherein polymerising the liquid comprises initiating a polymerisation reaction by exposing the polymerisable liquid to ultraviolet light or heat.

12. The method of claim 11, wherein the polymerisable liquid comprises a metha(acrylate) monomer, an epoxy, a vinylether monomer or a thiolene system.

13. The method of claim 1, wherein the suspension has a concentration of elongate particles by weight of less than 1%.

14. The method of claim 2, wherein the longitudinal axes of the elongate particles are orientated to be perpendicular to the substrates.

15. An optical integrator panel having a homogeneous distribution of elongate particles, the optical integrator panel being formed according to the method of claim 1.

* * * * *